US009180724B2

(12) United States Patent
Skinner et al.

(10) Patent No.: US 9,180,724 B2
(45) Date of Patent: Nov. 10, 2015

(54) DRY-ERASE DRAWING SHEET AND APPARATUS (75) Inventors: Craig Skinner, Easton, PA (US); Joseph Thomas Moll, Bethlehem, PA (US); Vito Niosi, Easton, PA (US)

(73) Assignee: Crayola, LLC, Easton, PA (US)

( * ) Notice: Subject to any disclaimer, the term of this patent is extended or adjusted under 35 U.S.C. 154(b) by 192 days.

(21) Appl. No.: 13/229,996

(22) Filed: Sep. 12, 2011

(65) Prior Publication Data

US 2012/0188649 A1 Jul. 26, 2012

Related U.S. Application Data (60) Provisional application No. 61/434,717, filed on Jan. 20, 2011.

(51) Int. Cl.
*G02B 27/10* (2006.01)
*B43L 1/00* (2006.01)
*B43K 23/00* (2006.01)
*B43L 1/12* (2006.01)
*G02B 27/22* (2006.01)

(52) U.S. Cl.
CPC ............... B43L 1/00 (2013.01); B43K 23/001 (2013.01); B43L 1/12 (2013.01); *G02B 27/2214* (2013.01); *G02B 27/2221* (2013.01)

(58) Field of Classification Search
CPC .......... G02B 27/2214; G02B 27/0172; G02B 27/22; G02B 27/2221; G02C 11/10
USPC .................... 359/618–628; 345/173
See application file for complete search history.

(56) References Cited

U.S. PATENT DOCUMENTS

| 3,067,530 | A | 12/1962 | Bolsey |
| 3,264,164 | A | 8/1966 | Jerothe et al. |
| 5,330,799 | A | 7/1994 | Sandor et al. |
| 5,361,164 | A * | 11/1994 | Steliga .......................... 359/455 |
| 5,554,432 | A | 9/1996 | Sandor et al. |
| 5,712,731 | A | 1/1998 | Drinkwater et al. |
| 5,757,545 | A | 5/1998 | Wu |
| 6,101,039 | A | 8/2000 | Blazey |
| 6,476,965 | B1 * | 11/2002 | He et al. .......................... 359/455 |
| 6,530,664 | B2 | 3/2003 | Vanderwerf et al. |
| 7,130,126 | B1 | 10/2006 | Chung |
| 7,336,422 | B2 | 2/2008 | Dunn et al. |
| 2006/0061089 | A1 * | 3/2006 | Arlook .............................. 283/56 |
| 2006/0214922 | A1 * | 9/2006 | Moore et al. .................... 345/173 |
| 2009/0303603 | A1 * | 12/2009 | Goggins ......................... 359/628 |
| 2010/0015403 | A1 | 1/2010 | Sacks et al. |
| 2010/0018644 | A1 | 1/2010 | Sacks et al. |
| 2010/0171929 | A1 * | 7/2010 | Liu et al. ........................... 353/29 |

* cited by examiner

*Primary Examiner* — Ricky Mack
*Assistant Examiner* — Daniele Manikeu
(74) *Attorney, Agent, or Firm* — Shook, Hardy & Bacon, L.L.P.

(57) ABSTRACT

Dry-erase drawing sheets, a drawing apparatus, and a dry-erase drawing kit are described. The drawing sheets have a non-lenticular or a lenticular lens arrangement on a top surface, material layers comprising a body of the sheet, and images printed on surfaces of one or more of the material layers. The images are configured to sufficiently interact with the lens arrangement to exhibit a three-dimensional visual and/or animated effect when viewed through the top surface. The drawing sheets also include a dry-erase compatible layer overlying the top surface. The drawing apparatus includes a frame that has a central opening and a backing member that releasably couples to the frame. Together the frame and backing member retain the drawing sheets within the central opening of the frame during use. The drawing sheets, drawing apparatus, and one or more dry-erase crayons or markers are provided in the kit.

20 Claims, 9 Drawing Sheets

DRY-ERASE DRAWING SHEET AND APPARATUS

CROSS-REFERENCE TO RELATED APPLICATIONS

This application claims priority to U.S. Provisional Patent Application No. 61/434,717 filed Jan. 20, 2011, the disclosure of which is hereby incorporated herein in its entirety by reference.

SUMMARY

Embodiments of the invention are defined by the claims below, not this summary. A high-level overview of various aspects of the invention are provided here for that reason, to provide an overview of the disclosure, and to introduce a selection of concepts that are further described below in the Detailed-Description section. This summary is not intended to identify key features or essential features of the claimed subject matter, nor is it intended to be used as an aid in isolation to determine the scope of the claimed subject matter.

Embodiments of the invention include drawing sheets, a drawing apparatus, and a kit. The drawing sheets include a lenticular or non-lenticular lens arrangement that overlies one or more image layers. The image layers are configured to interact with the lenticular or non-lenticular lens arrangement to produce three-dimensional and animated effects when viewed by a user. A dry-erase compatible layer is also included in the drawing sheet overlying the lenticular or non-lenticular lens arrangement. The dry-erase compatible layer allows marking and erasure of marks from the surface by dry-erase markers, crayons, paints, and the like.

The drawing apparatus provides a frame into which the drawings sheets are disposed and may include recesses for storing marking instruments. The drawing sheets, drawing apparatus, and a set of marking instruments such as dry-erase crayons are combined to form a dry-erase drawing kit.

In use, embodiments of the invention provide a user with an exciting drawing surface for creating drawings and the like that can be erased and reused multiple times. And the background of the drawings provided by the drawing sheets exhibits a three-dimensional effect such that the drawings appear to float on top of the drawing sheets or to extend into the page. Additionally, the drawings and background may appear to have depth or to be animated when the drawing apparatus is moved with respect to the lenticular or non-lenticular lens arrangement.

DESCRIPTION OF THE DRAWINGS

Illustrative embodiments of the invention are described in detail below with reference to the attached drawing figures, and wherein.

DETAILED DESCRIPTION

The subject matter of embodiments of the invention is described with specificity herein. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Embodiments of the invention are described herein as using lenticular and non-lenticular lens arrangements. However, such is not intended to limit embodiments of the invention to those lens arrangements; other lens arrangements may be employed without departing from the scope described herein. The lens arrangements are configured to cause the drawing sheets into which they are incorporated to exhibit a three-dimensional (3-D) effect and/or an animated effect.

Figure 1A:
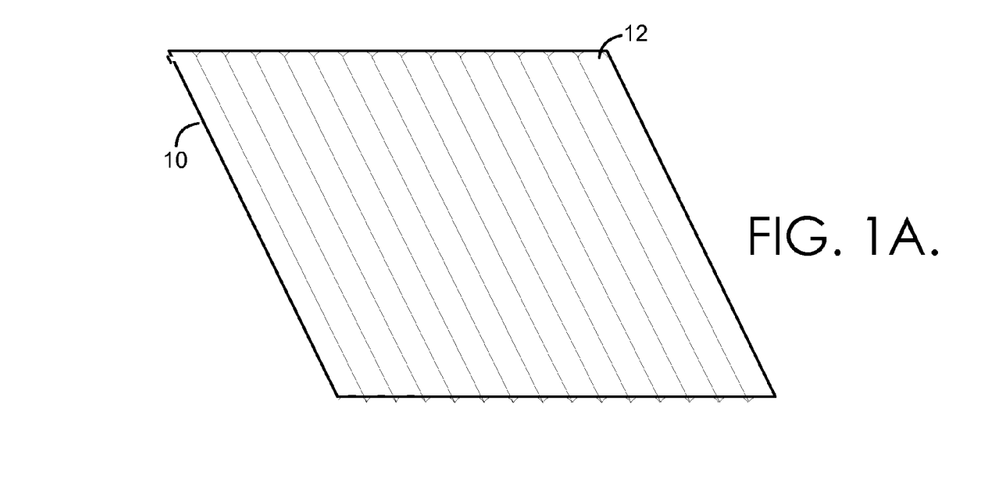
FIG. 1A is a perspective view depicting a lenticular sheet in accordance with an embodiment of the invention.

Lenticular lens arrangements are embodied in a sheet that includes an array of semi-cylindrical lenses formed on a surface thereof. An exemplary lenticular lens arrangement 10 is depicted in FIG. 1A. Lenses 12 extend parallel to one another along the length of the surface such that they are viewed along their length and provide the surface with a ribbed texture. The cross-sectional shape of the lenses is configured to provide viewing angles that correspond with images printed beneath the lens arrangement. The images are also configured such that each of a number of images is visible only at one or more specific viewing angles. As such, as the viewing angle of the surface is rotated about an axis parallel to the length of the lenses, the various images printed beneath the lens arrangement come into focus, or become visible, respectively to provide the appearance of animation or a 3-D effect. Various other lenticular lens arrangements are available in the art. The description provided herein is intended to briefly describe one such embodiment and not to limit embodiments of the invention to any particular lens arrangement.

Figure 1B:
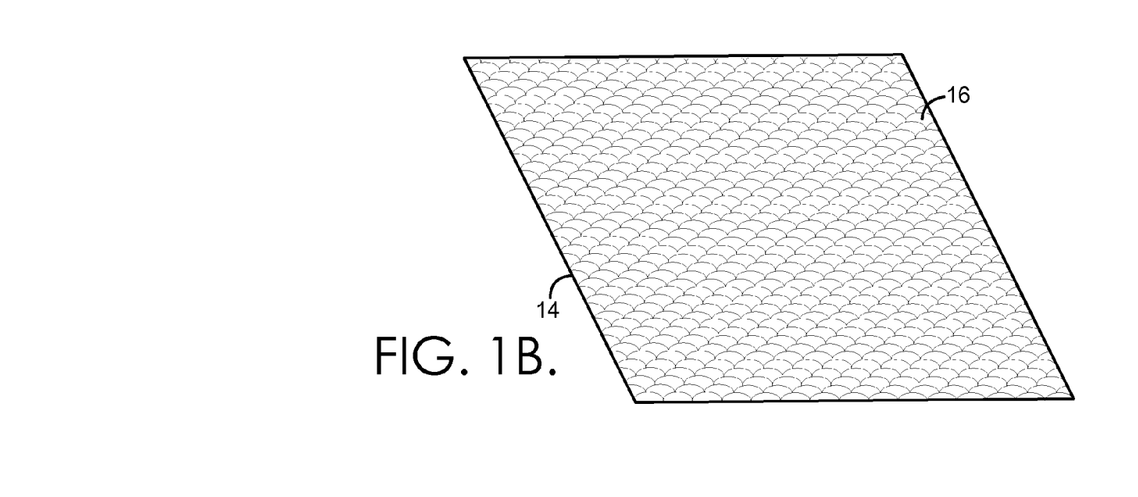
FIG. 1B is a perspective view of a non-lenticular sheet in accordance with an embodiment of the invention.

Non-lenticular lens arrangements include a series of convex or concave, semispherical lenses arranged on a surface. An exemplary non-lenticular lens arrangement 14 is depicted in FIG. 1B. U.S. Pat. No. 7,130,126 to Hyunin Chung (the '126 patent) describes one exemplary non-lenticular lens arrangement; the '126 patent is incorporated herein in its entirety by reference. The '126 patent describes a non-lenticular lens arrangement on a plastic sheet.

The non-lenticular lens arrangement includes an array of semispherical convex lenses (such as lenses 16 depicted in FIG. 1B) arranged on the surface of the sheet. Beneath the lens arrangement the sheet includes a transparent plate with a thickness corresponding to the focal length of the convex lenses. A non-focal distance printed layer is printed on the top surface of the plate and a focal distance printed layer is printed on the bottom of the plate using off-set printing techniques. As such, a three-dimensional view is provided to an observer of the plastic sheet and can be seen from any viewing angle due to the convex lens shape. Additionally, images printed on the non-focal distance printed layer appear to float in the space that is visually created by the focal-distance printed layer. Various other non-lenticular lens arrangements are available in the art. The description provided herein is intended to briefly describe one such embodiment and not to limit embodiments of the invention to any particular lens arrangement.

Embodiments of the invention include drawing sheets, a drawing apparatus, and a dry-erase drawing kit. In an embodiment, a drawing sheet is provided. The drawing sheet includes a lenticular or non-lenticular lens arrangement on a top surface and one or more material layers comprising a body of the sheet. The sheet also includes images or patterns printed on surfaces of the material layers that are configured to sufficiently interact with the lenticular or non-lenticular lens arrangement to exhibit a three-dimensional visual effect and/or an animated effect when viewed through the top surface. A dry-erase compatible layer is also provided overlying the top surface. The dry-erase compatible layer accepts markings from dry-erase marking instruments and permits erasure of the markings.

In another embodiment, a drawing apparatus is described. The apparatus includes a frame that has a central opening, a backing member configured to releasably couple to the frame within the central opening, and drawing sheets. The drawing sheets include a non-lenticular or a lenticular lens arrangement on a top surface, material layers comprising a body of the sheet, images or patterns printed on surfaces of the material layers and configured to sufficiently interact with the lens arrangement to exhibit a three-dimensional visual effect and/or an animated effect when viewed through the top surface, and a dry-erase compatible layer overlying the top surface that accepts markings from dry-erase marking instruments and permits erasure of the markings. The drawing sheets are removeably disposed within the central opening of the frame between an overlapping portion of the frame and the backing member.

In another embodiment, a dry-erase drawing kit is described. The kit includes a drawing apparatus that includes a frame that has a central opening and a backing member configured to releasably couple to the frame within the central opening. The kit also includes drawing sheets configured to be removeably disposed within the central opening of the frame between an overlapping portion of the frame and the backing member. The drawing sheets have a non-lenticular or a lenticular lens arrangement on a top surface, material layers comprising a body of the sheet, images or patterns printed on surfaces of one or more of the material layers and are configured to sufficiently interact with the lens arrangement to exhibit a three-dimensional visual effect and/or an animated effect when viewed through the top surface. The drawing sheets also include a dry-erase compatible layer overlying the top surface that accepts markings from dry-erase marking instruments and permits erasure of the markings. Dry-erase crayons are also provided in the kit.

Figure 2:
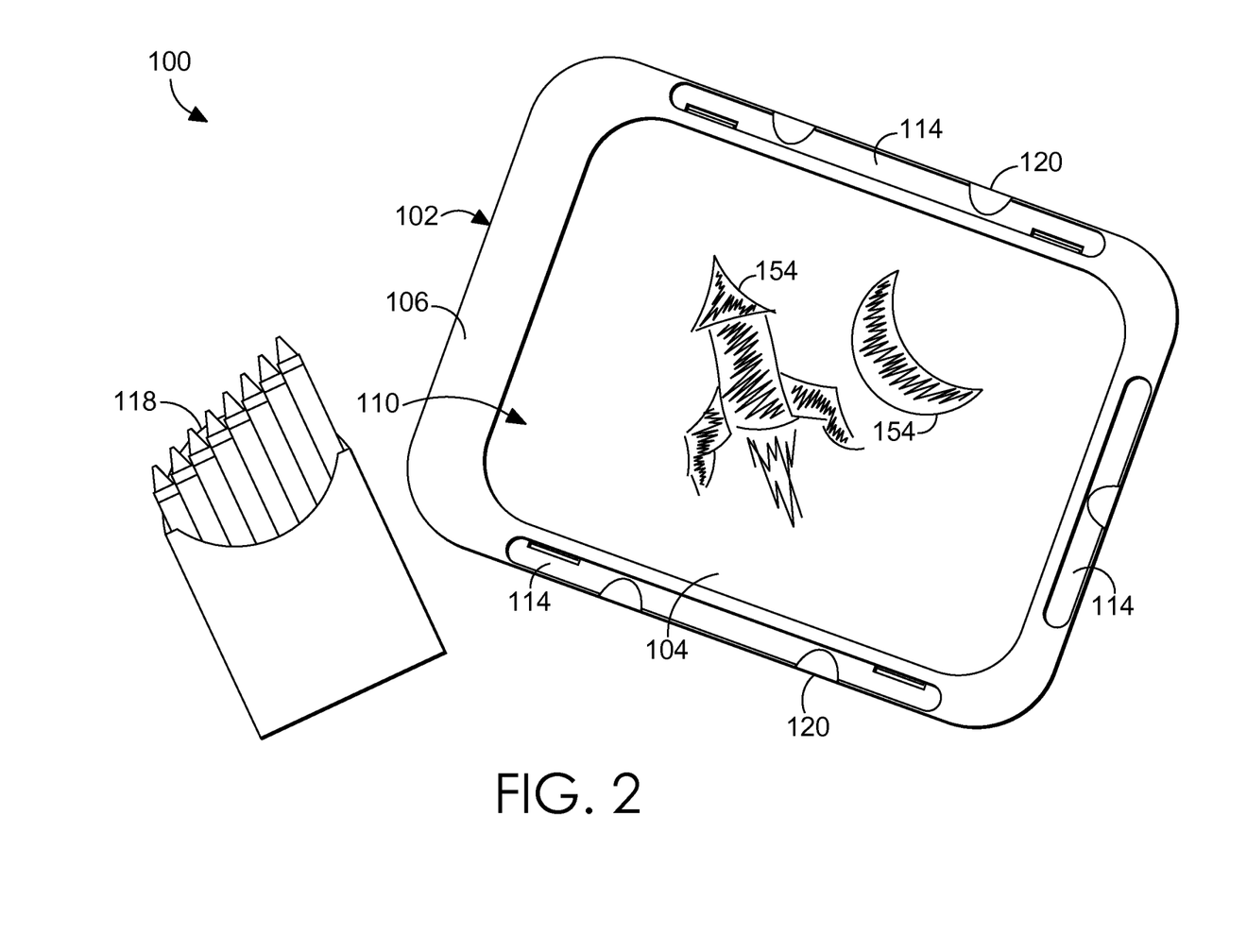
FIG. 2 is a top plan view depicting a kit that includes a drawing apparatus and a set of dry-erase crayons in accordance with an embodiment of the invention.
Figure 6:
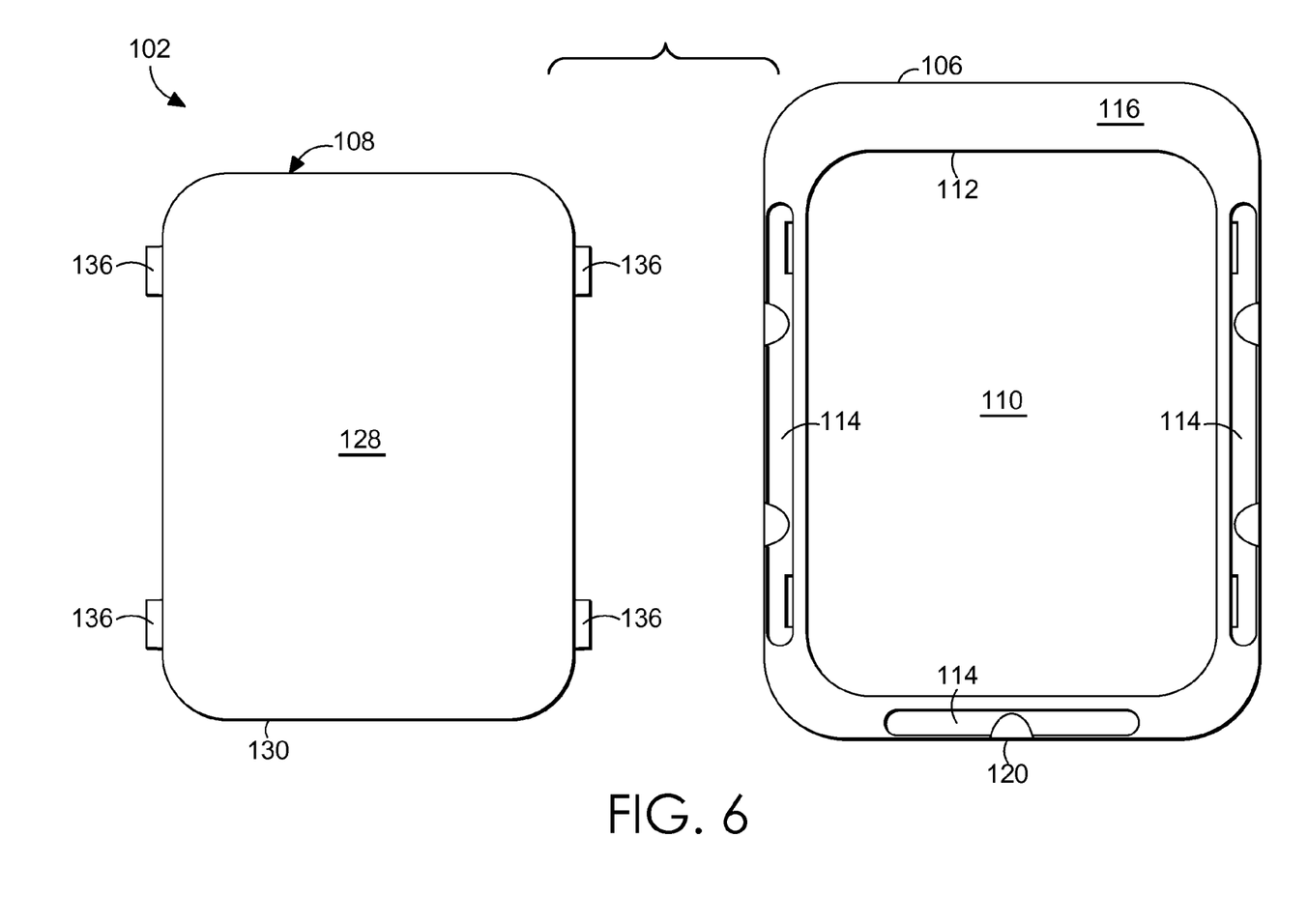
FIG. 6 is a top plan view depicting a disassembled drawing apparatus in accordance with an embodiment of the invention.

With reference now to FIGS. 2-9, a drawing apparatus 100 is described in accordance with embodiments of the invention. As depicted in FIG. 2, the drawing apparatus 100 includes a housing 102 and a sheet 104. The housing includes a frame 106 and a backing member 108 as best depicted in FIG. 6. The frame 106 and backing member 108 are constructed from any available materials known in the art such as, for example, and not limitation, plastics, resins, metals, and cardboard and may be fabricated by any available methods. For example, the frame 106 and backing member 108 might be fabricated by injection molding a plastic material.

Figure 3:
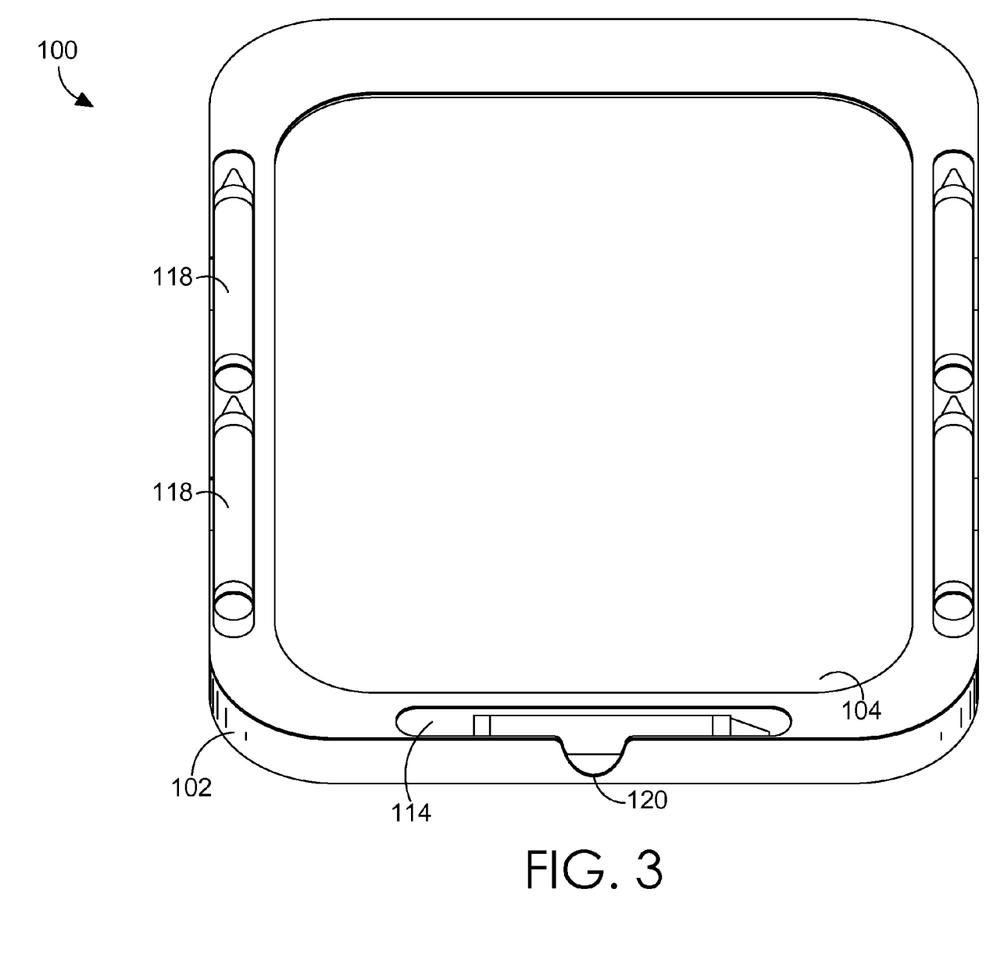
FIG. 3 is a top perspective view depicting a drawing apparatus with dry-erase crayons retained therein in accordance with an embodiment of the invention.
Figure 7:
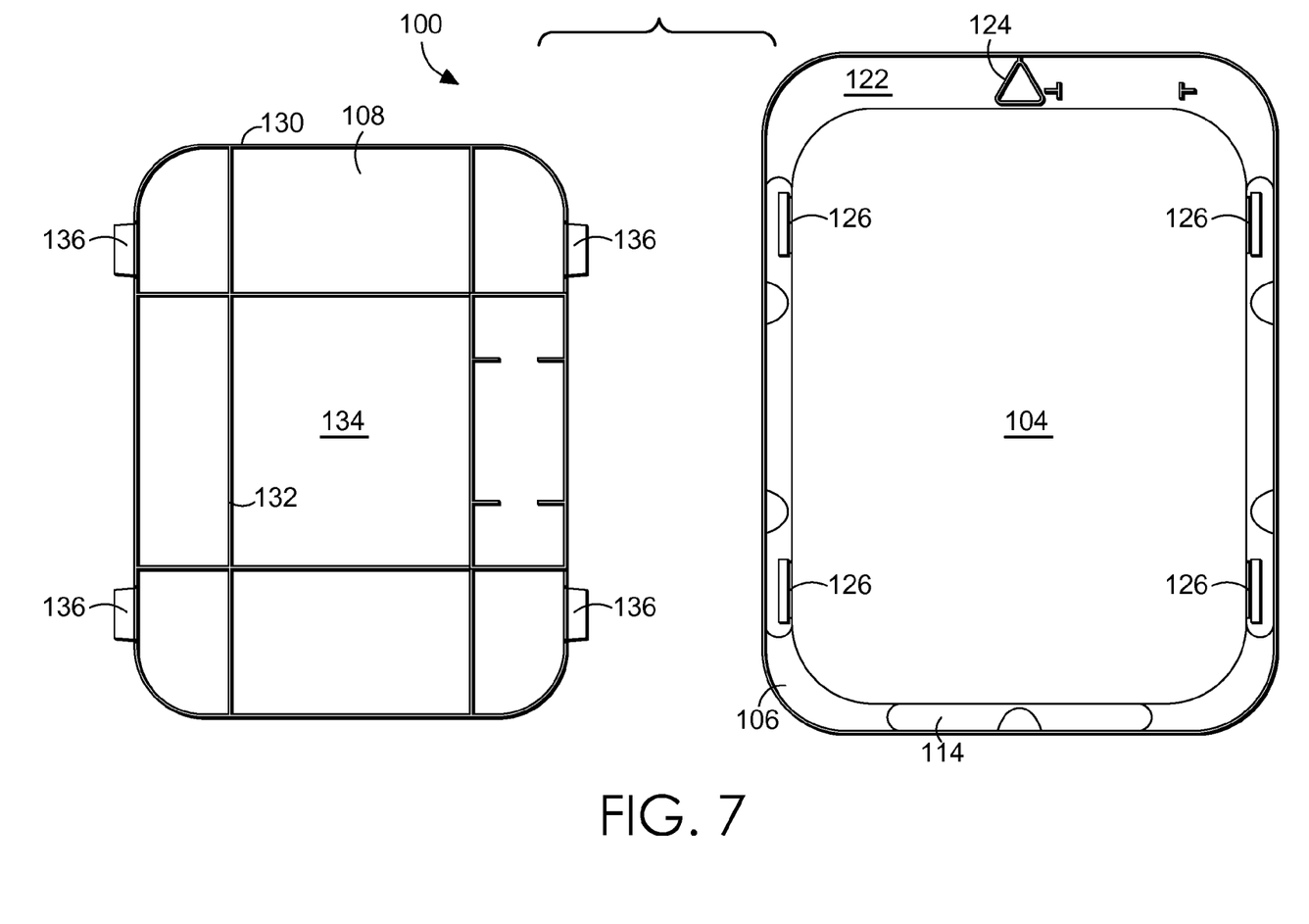
FIG. 7 is a bottom plan view depicting a disassembled drawing apparatus in accordance with an embodiment of the invention.

As shown best shown by FIGS. 6 and 7, the frame 106 has a generally rectangular shape with a similarly shaped central opening 110 defined by the interior perimeter 112 of the frame 106. However, the frame 106 and central opening 110 may have any desired shape. In an embodiment, the frame 106 includes one or more recesses 114 in a top surface 116 thereof. The recesses 114 are configured to accept one or more marking instruments 118 therein and to retain the marking instruments 118 via friction fit, as depicted in FIG. 3. The recesses might also include a cut-out 120 to allow a user to grasp and remove a marking instrument 118 disposed within the recess 114. In another embodiment, the recesses 114 can be configured to accept any type of marking instrument 118 and may include clips, latches, VELCRO, and the like to aid in retaining the marking instruments 118 within the recess 114.

A backside 122 of the frame 106 is depicted in FIG. 7. The backside may include a hanging feature 124 by which the apparatus 100 might be hung on a wall for display. The frame 106 also includes a plurality of apertures 126 for removeably coupling to the backing member 108.

Figure 4:
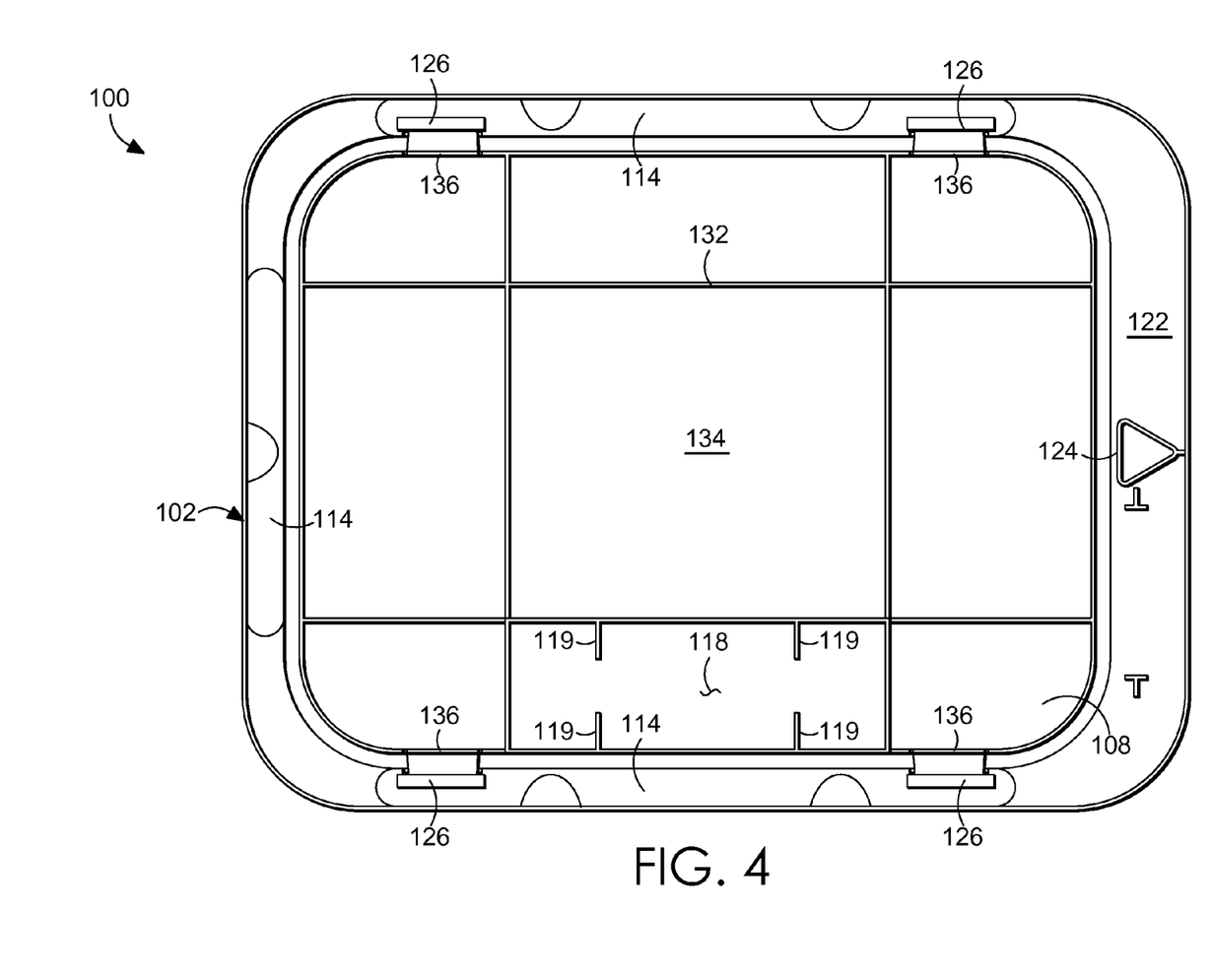
FIG. 4 is a bottom plan view depicting a bottom side of a drawing apparatus in accordance with an embodiment of the invention.
Figure 5A:
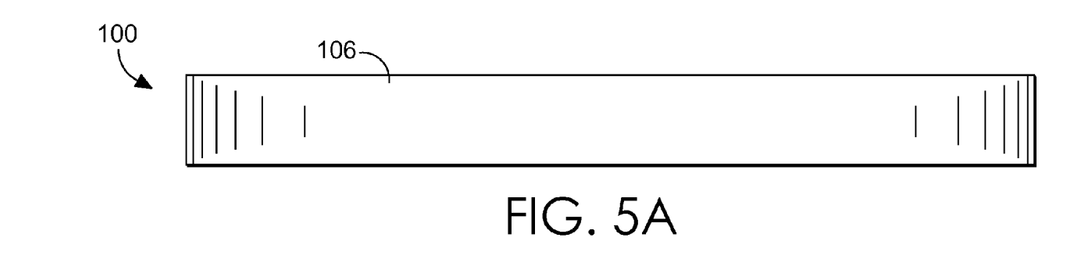
FIG. 5A-C are elevational views of a top, side, and bottom edge, respectively, of a drawing apparatus in accordance with an embodiment of the invention.
Figure 5B:
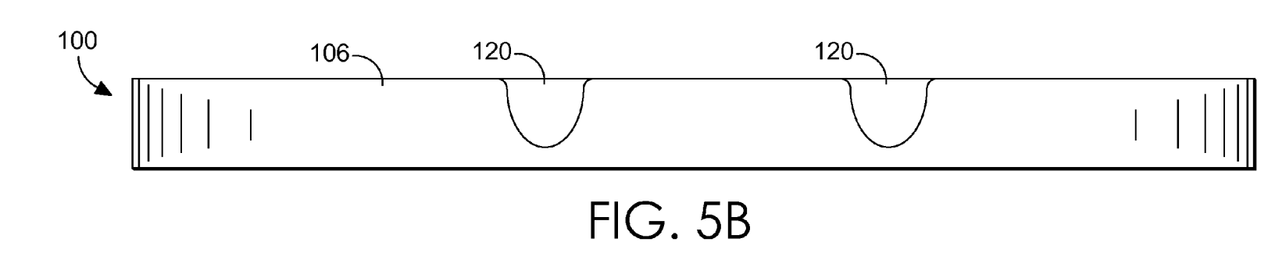
Figure 5C:
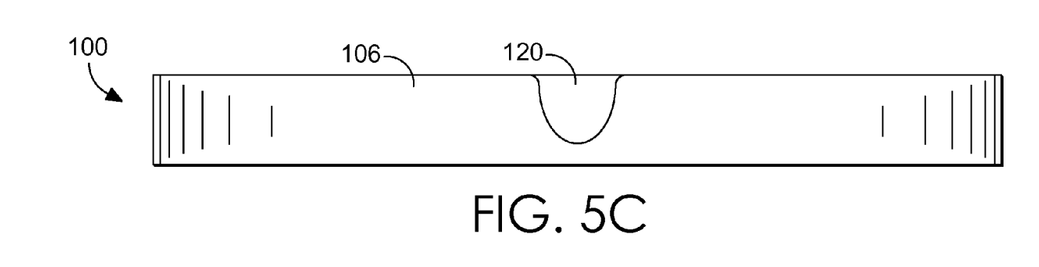

With continued reference to FIGS. 6 and 7, the backing member 108 comprises a plate-like member with a flat, top surface 128 and an exterior perimeter 130 having dimensions equal to or just larger than the central opening 110 of the frame 106. The backing member 108 may include one or more ribs 132 on a backside 134 for structurally reinforcing the backing member 108. The backing member also includes a plurality of flanges 136 extending outwardly from the exterior perimeter 130 thereof. The flanges 136 are configured to mate with the apertures 126 on the frame 106 to releasably couple the backing member 108 within the central opening 110 of the frame 106, as depicted in FIG. 4. In another embodiment, the backing member 108 and frame 106 utilize any desired features or appendages for removeably coupling the backing member 108 within the central opening 110 of the frame 106. Additionally, the backside 122 of the frame 106 or the backside 134 of the backing member 108 might also include a holding location 118 for an eraser or a crayon sharpener (not shown) that fits snugly between a pair of tabs 119 extending therefrom.

Figure 8:
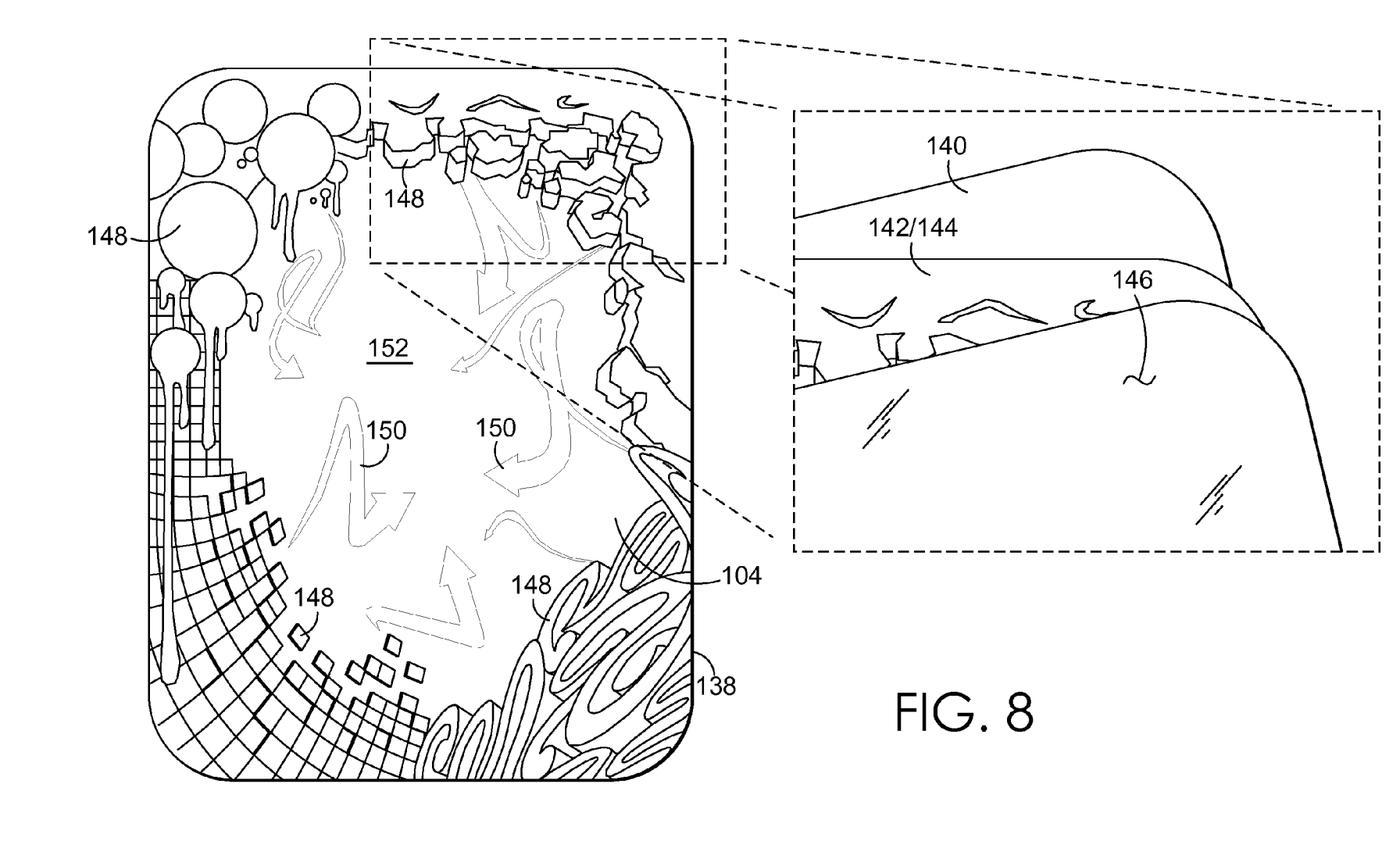
FIG. 8 is a graphical representation of a drawing sheet of a drawing apparatus and a blow-out window depicting separated layers of the drawing sheet in accordance with an embodiment of the invention.
Figure 9:
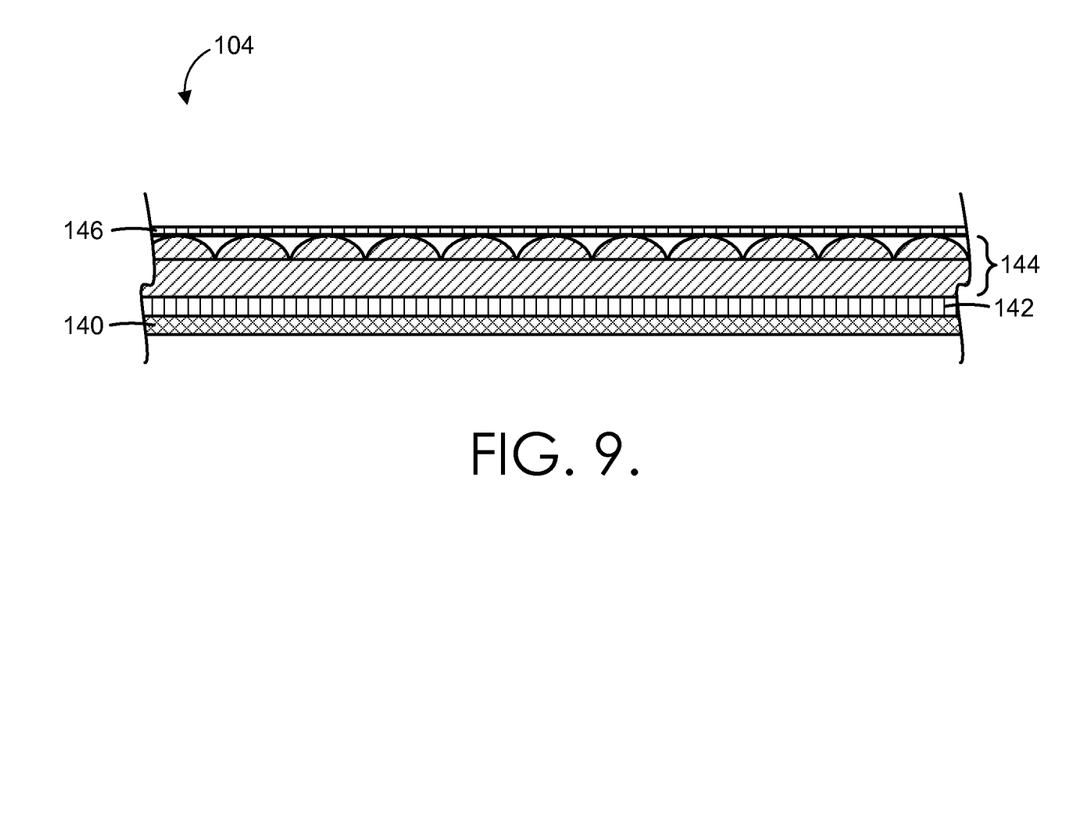
FIG. 9 is a cross-sectional end view of a drawing sheet in accordance with an embodiment of the invention.

With additional reference now to FIGS. 8 and 9, the sheet 104 is described in accordance with an embodiment of the invention. The sheet 104 has an outer perimeter 138 similar in shape to that of the interior perimeter 112 of the frame 106 and the exterior perimeter 130 of the backing member 108 and has dimensions larger than the interior perimeter 112 of the frame 106. The sheet 104 is comprised of a plurality of layers that include one or more of a backing layer 140, an image layer 142, a lenticular or non-lenticular lens arrangement 144, and a dry-erase compatible layer 146. The layers 140-146 maybe laminated, glued, or bound together by any desired means. In an embodiment, the dry-erase compatible layer 146 is laminated over a top surface of the lens arrangement 144. In another embodiment, the backing layer 140, the image layer 142, and the lens arrangement 144 are laminated between the dry-erase compatible layer 146 and a second dry-erase or non-dry-erase compatible laminate layer (not shown).

The backing layer 140 includes any desired materials such as, for example, and not limitation, card stock, plastics, cardboard, paper, and the like for providing a desired stiffness and rigidity to the sheet 104. In an embodiment, the backing layer 140 is omitted.

The image layer 142 is comprised of a section of material upon which one or more images can be printed. In an embodiment, the image layer 142 is integral with the backing layer 140. The images printed on the image layer 142 might include one or more of foreground images 148, background images 150, and a background 152, as depicted best by FIG. 8. Additionally, the printing of the images 148-152 on the image layer 142 is configured in accordance with the lens arrangement 144 so as to provide three-dimensional or animated effects when images 148-152 are viewed through the lens arrangement 144 as described below.

The lens arrangement 144 includes one or more of a lenticular lens arrangement, a non-lenticular lens arrangement, or any other desired lens arrangement as described above. The lens arrangement 144 overlies the image layer 142 and is positioned such that the lenses of the lens arrangement 144 are in registration with the images 148, 150, and 152 of the image layer 142. In an embodiment, the image layer 142 and the lens arrangement 144 are integrated such that images are printed at various depths within the lens arrangement to provide focal distance images and non-focal distance images as required by a chosen lens arrangement.

The dry-erase compatible layer 146 is generally transparent or translucent and provides a surface that can be marked on with a dry-erase marking instrument 118 and that allows such markings to be easily removed therefrom. The dry-erase compatible layer 146 may include a top surface 148 that is treated with one or more chemicals or processes to provide a dry-erase compatible surface. In an embodiment, the dry-erase layer 146 is made from polyethylene terephthalate (PET) or other clear, smooth, non-porous materials. In an embodiment, the dry-erase compatible layer is configured for use with dry-erase crayons. In embodiments, the dry-erase marking instruments 118 include one or more of dry-erase crayons, dry-erase markers, dry-erase paints, or dry-erase inks. Although embodiments of the invention are described herein as employing dry-erase markers and dry-erase compatible layers 146, any erasable marking device might be employed. For example, a wet-erase marker that includes a water-based ink that is erasable with a wet cloth or sponge might be employed.

Referring again to FIGS. 2-9, the operation of the drawing apparatus 100 is described in accordance with an embodiment of the invention. Initially, the backing member 108 is removed from the frame 106 by decoupling the flanges 136 from the apertures 126, as depicted by FIG. 6. A sheet 104 is placed within the backside 122 of the frame 106 and overlying the central opening 110. The sheet 104 is positioned such that the dry-erase compatible layer 146 faces the backside 122 of the frame 106, as shown in FIG. 7. In an embodiment, multiple sheets 104 are stacked within the frame 106; one sheet 104 being visible through the central opening 110 of the frame 106 and the remaining sheets 104 being stored behind the visible sheet 104. The backing member 108 is inserted into the frame 106 from the backside 122 and the flanges 136 are inserted into the apertures 126 thereby, coupling the backing member 108 to the frame 106 and capturing the sheet(s) 104 therebetween.

A user views the sheet 104 through the central opening 110 of the frame 106 to see the images 148, 150, and 152 printed on the sheet 104. Additionally, the user tilts or moves the apparatus 100 about one or more axis to be provided with a three-dimensional or animated view of the images 148, 150, and 152 that results from viewing the images 148, 150, and 152 through the lens arrangement 144. For example, the lens arrangement 144 might make the foreground images 148 appear to float over the background 152 printed on the sheet 104 or appear to give the sheet 104 a visual depth. And tilting or moving the apparatus 100 might cause the foreground images 148 and/or the background images 152 to appear to move within the a visual depth of the sheet 104.

Also, a user employs one or more of the marking instruments 118 to mark or draw on the dry-erase compatible layer 146 of the sheet 104 such as depicted at 154. Similarly to the images 148, 150, and 152, the markings 154 might also be provided with a three-dimensional or animated effect when viewed on the sheet 104. The three-dimensional and animated effects are accentuated by tilting or moving the apparatus 100. The markings 154 are erasable from the dry-erase compatible surface 146 by wiping the surface 146 with a cloth, tissue, finger, or other material. The drawing sheet 104 is removable from the apparatus 100 by reversing the steps described above and is replaceable with another sheet 104 as desired by a user.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. A drawing sheet comprising:
a lens arrangement layer having a plurality of lenses;
one or more material layers comprising a body of the sheet, the lens arrangement layer overlaying the one or more material layers;
a plurality of images printed on a surface of one or more of the one or more material layers and configured to optically interact with the plurality of lenses to exhibit a visual effect when viewed through the lens arrangement layer overlaying the one or more material layers, wherein the plurality of images comprises:
(1) a background having one or more background images; and
(2) one or more foreground images; and
a dry-erase compatible layer overlying the lens arrangement layer that accepts markings from a marking instrument and permits erasure of the markings, wherein the markings accepted by the dry-erase compatible layer are accepted in context of the plurality of images that optically interact with the lens arrangement,
wherein the plurality of lenses of the lens arrangement layer are in registration with the background, the one or more background images, and the one or more foreground images such that the one or more foreground images are configured to have an appearance of floating at a distance above the background and the one or more background images.

2. The drawing sheet of claim 1, wherein the lens arrangement is a non-lenticular lens arrangement.

3. The drawing sheet of claim 1, wherein the lens arrangement is a lenticular lens arrangement.

4. The drawing sheet of claim 1, wherein the visual effect is a three-dimensional effect.

5. The drawing sheet of claim 1, wherein the visual effect is an animated effect.

6. The drawing sheet of claim 1, wherein the marking instrument is a dry-erase marking instrument.

7. The drawing sheet of claim 6, wherein the dry-erase marking instrument is a dry-erase crayon.

8. The drawing sheet of claim 1, wherein the marking instrument is a wet-erase marking instrument.

9. The drawing sheet of claim 1, wherein the dry-erase compatible layer is laminated to the lens arrangement layer.

10. The drawing sheet of claim 1, wherein the dry-erase compatible layer is composed of a polyethylene terephthalate (PET).

11. A drawing apparatus comprising:
a frame that has a central opening;
a backing member coupled to the frame and overlapping at least a portion of the central opening; and
a drawing sheet that is disposed between the frame and the backing member and that includes a lens arrangement layer, overlaying one or more material layers comprising a body of the sheet, an image printed on a surface of one or more of the one or more material layers and configured to optically interact with the lens arrangement layer to exhibit a visual effect when viewed through the lens arrangement layer, and a dry-erase compatible layer overlying the lens arrangement layer that accepts markings from a marking instrument and permits erasure of the markings,
wherein the image printed on the surface of one or more of the one or more material layers comprises a background comprising one or more background images, and one or more foreground images,
wherein the lens arrangement layer comprises a plurality of lenses in registration with the background, the one or more foreground images, and the one or more background images such that the one or more foreground images have a visual appearance of floating at a depth above the background and the one or more background images,
wherein the dry-erase compatible layer is configured to accept markings in context of the image that optically interacts with the lens arrangement layer such that the markings are received in the context of one or more images having one or more of a three-dimensional effect and an animated effect.

12. The drawing apparatus of claim 11, wherein the lens arrangement layer comprises one or more of a non-lenticular and a lenticular lens arrangement.

13. The drawing apparatus of claim 11, wherein the drawing sheet is removeably disposed between the frame and the backing member and is replaceable with another drawing sheet.

14. The drawing apparatus of claim 11, wherein a plurality of drawing sheets are disposed in the frame in a stacked orientation such that a topmost drawing sheet is visible in the central opening and one or more additional drawing sheets are stored between the topmost drawing sheet and the backing member.

15. The drawing apparatus of claim 11, wherein the frame includes one or more recesses or features for accepting and releasably retaining the marking instrument.

16. The drawing apparatus of claim 11, wherein the backing member comprises a flat surface with an exterior perimeter having dimensions just larger than a perimeter of the central opening and including one or more first features about the exterior perimeter configured to removably couple the backing member to the frame.

17. The drawing apparatus of claim 16, wherein the frame includes one or more second features adjacent the perimeter of the central opening that are configured to mateably couple to the first features of the backing member.

18. The drawing apparatus of claim 11, wherein the frame includes a hanger on a backside thereof for hanging the drawing apparatus on a wall.

19. A dry-erase drawing kit comprising:
a drawing apparatus that includes a frame that has a central opening and a backing member coupled to the frame and overlapping the central opening;
a dry-erase marking instrument; and
one or more drawing sheets disposed within the central opening of the frame between at least one overlapping portion of the frame and the backing member, the one or more drawing sheets comprising:
(1) an image layer comprised of a section of material upon which one or more images are printed, wherein the one or more images comprise one or more foreground images and one or more background images;
(2) a lens arrangement layer overlying the image layer such that the image layer and the lens arrangement layer are integrated to provide focal distance images and non-focal distance images, the lens arrangement configured to provide three-dimensional or animated effects when the one or more images are viewed through the lens arrangement;
(3) a dry-erase compatible layer comprised of transparent material overlying the lens arrangement, wherein the dry-erase compatible layer provides a surface that can be marked on with the dry-erase marking instruments and permits erasure of the markings, and further wherein one or more markings accepted by the dry-erase compatible layer have one or more of a three-dimensional effect and an animated effect when viewed in the context of the images printed on the image layer.

20. The dry-erase drawing kit of claim 19, wherein the one or more foreground images are configured to have an appearance of floating over the one or more background images when viewed through the lens arrangement layer.

\* \* \* \* \*